US007136899B1

(12) United States Patent  
Campailla

(10) Patent No.: US 7,136,899 B1  
(45) Date of Patent: Nov. 14, 2006

(54) INVERSE QUERY DECISIONS USING BINARY DECISION DIAGRAMS AND SUB-EXPRESSION IMPLICATIONS

(75) Inventor: Alexis Campailla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 789 days.

(21) Appl. No.: 09/734,305

(22) Filed: Dec. 11, 2000

(51) Int. Cl.  
*G06F 15/16* (2006.01)

(52) U.S. Cl. .................. 709/206; 709/206; 709/202; 709/217; 705/35

(58) Field of Classification Search ............... 709/217, 709/215, 216, 229, 226, 241, 206, 202; 707/1, 707/3; 705/35  
See application file for complete search history.

(56) References Cited

U.S. PATENT DOCUMENTS

| 5,201,046 A | 4/1993 | Goldberg et al. |
| 5,899,985 A | 5/1999 | Tanaka |
| 6,405,191 B1 | 6/2002 | Bhatt et al. |
| 6,738,868 B1 * | 5/2004 | Gharachorloo et al. ..... 711/411 |
| 2002/0169670 A1 * | 11/2002 | Barsade et al. ............... 705/14 |

OTHER PUBLICATIONS

Andersen, H., "An Introduction to Binary Decision Diagrams", *Dept. of Information Technology, Technical University of Denmark*, Lecture notes for 49285, Advanced Algorithms E97, pp. 1-36 (Oct. 1997).  
Socher, R., "Optimizing the Clausal Normal Form Transformation", *Journal of Automated Reasoning*, vol. 7, pp. 325-336 (1991).  
Andersen, H., "An Introduction to Binary Decision Diagrams", Lecture notes for 49285 Advanced Algorithms #97, Department of Information Technology, Technical University of Denmark, pp. 1-36, Web://www.it.dtu.dk/~hra (Oct. 1997).

Bryant, R., "Symbolic Boolean Manipulation with Ordered Binary Decision Diagrams", *ACM Computing Surveys*, School of Computer Science, Carnegie Mellon University, Pittsburgh, PA, pp. 1-30 (Jul. 1992).  
U.S. Appl. No. 09/734,379, "Inverse Query Decisions Using Sub-Expression Implications".

* cited by examiner

*Primary Examiner*—Jason Cardone  
*Assistant Examiner*—Adnan M. Mirza  
(74) *Attorney, Agent, or Firm*—Merchant & Gould P.C.

(57) ABSTRACT

A method, computer program product, and a publication-subscription broker server computing system for filtering one or more messages for transmission to a subscriber computing system according to an individual information request criteria using binary decision diagrams. The computer program product contains instructions that implement the disclosed method. The publication-subscription broker server contains a computer process that implements the disclosed method. The method constructs an evaluation graph for each individual information request criteria specified for each subscriber, identifies logical implications from one or more binary decision diagrams from a first information request criteria to one or more corresponding binary decision diagrams within a second information request criteria, receives one or more messages to be filtered, evaluates a first information request criteria based upon information within the received messages, evaluates one or more information request criteria based upon information within the received messages using the identified logical implications between one or more binary decision diagrams within the information request criteria being evaluated and one or more binary decision diagrams previously evaluated, and transmits the received message to the subscriber computing system corresponding to an information request criteria evaluated to be satisfied by information contained within the received message.

15 Claims, 13 Drawing Sheets

INVERSE QUERY DECISIONS USING BINARY DECISION DIAGRAMS AND SUB-EXPRESSION IMPLICATIONS

TECHNICAL FIELD

This application relates in general to a method, apparatus, and article of manufacture for providing a publication/subscription process for transmitting selected information to individual subscribing users from a larger set of information based upon individually specified criteria, and more particularly to a method, apparatus, and article of manufacture for providing a publication subscription process that uses an inverse query decision process to determine a set of data to be transmitted to individual subscribing users from a sequence of data records based upon individually specified criteria using Binary Decision Diagrams (BDDs).

BACKGROUND

The growth of the Internet and related communication networks has given rise to increasingly larger numbers of distributed information processing systems in which individual users obtain information from a ever increasing number of sources. Because of the large number of data sources, one class of distributed information processing systems being developed to provide users with control over this large amount of data are publication/subscription ("pub/sub") systems. These pub/sub systems typically include a broker server system that receives or obtains information from these data sources and forwards information to each subscribing user when the information satisfies criteria specified by each subscribing user.

Typically, each subscribing user specifies that he or she wants to receive information regarding a particular topic, such as a stock price for a particular publicly traded stock. The subscribing user may, for example, specify that he or she wants to receive all information related to the stock when the information relates to the price of the stock being not within a specified range of values. The subscribing user may choose the range to be centered upon the current price for the stock where the upper end of the range states a price where the stock should be sold to obtain a certain level of profits, and where the lower end of the range states a price that would limit the user's losses to an acceptable level. The broker system obtains the current trading price for the particular stock from a data source such as a stock ticker.

The broker system receives all of the stock trading information in the above example from one or more data sources as a sequence of messages. Each message received must be compared with the information request criteria to determine whether each individual message is to be sent to each user. As the number of subscribing user desiring to use such a broker system increases, and as the number of messages to be processed by a broker system increases, the processing needed to be performed by the broker system quickly becomes unmanageable. As both of these system parameters increase, the processing demand placed upon the broker system increases to a point well beyond the capacity of real-world processing systems.

As a result, the processing performed by the broker system needs to be modified to allow the processing performed by the broker system to scale at a much slower rate as both the number of subscribing users increases as well as the number of messages, and thus the amount of possible information processed for possible forwarding to users, increases. In many cases, current publication and subscription systems use a brute force processing methodology in which the information request criteria is individually processed for each subscribing user. The process of serving additional subscribing users and processing additional messages is scaled by using additional broker systems operating in parallel. Adding additional processing systems is expensive to install, operate, and maintain. Therefore, a process that slows the rate of growth of the processing performed as the number of users and number of messages increases is needed to assist in the use and exploitation of publication/subscription systems.

SUMMARY

In accordance with the present invention, the above and other problems are solved by providing a publication/subscription process for transmitting selected information to individual subscribing users from a larger set of information based upon individually specified criteria.

The great utility of the invention is that it provides a mechanism to slow the rate of growth of the processing performed publication/subscription broker server system as the number of users and number of messages increase. One aspect of the present invention is a method for filtering one or more messages for transmission to a subscriber computing system according to an individual information request criteria using binary decision diagrams. The method constructs an evaluation graph for each individual information request criteria specified for each subscriber, identifies logical implications from one or more binary decision diagrams from a first information request criteria to one or more corresponding binary decision diagrams within a second information request criteria, receives one or more messages to be filtered, evaluates a first information request criteria based upon information within the received messages, evaluates one or more information request criteria based upon information within the received messages using the identified logical implications between one or more binary decision diagrams within the information request criteria being evaluated and one or more binary decision diagrams previously evaluated, and transmits the received message to the subscriber computing system corresponding to an information request criteria evaluated to be satisfied by information contained within the received message.

Another aspect of the present invention is a computer program product readable by a computing system and encoding instructions for filtering one or more messages to be transmitted to a subscriber computing system according to an individual information request criteria in which the computer process implements the above method. Similarly, yet another aspect is a publication-subscription broker server computing system for filtering one or more messages to be transmitted to a subscriber computing system according to an individual information request criteria. The broker server has a memory module, a mass storage system, and a programmable processing module, the programmable processing module performing a sequence of operations to implement the above method. These and various other features as well as advantages, which characterize the present invention, will be apparent from a reading of the following detailed description and a review of the associated drawings.

BRIEF DESCRIPTION OF THE DRAWINGS

Referring now to the drawings in which like reference numbers represent corresponding parts throughout.

DETAILED DESCRIPTION

This application relates in general to a method, apparatus, and article of manufacture for providing a publication/subscription process for transmitting selected information to individual subscribing users from a larger set of information based upon individually specified criteria that uses an inverse query decision process.

Figure 1:
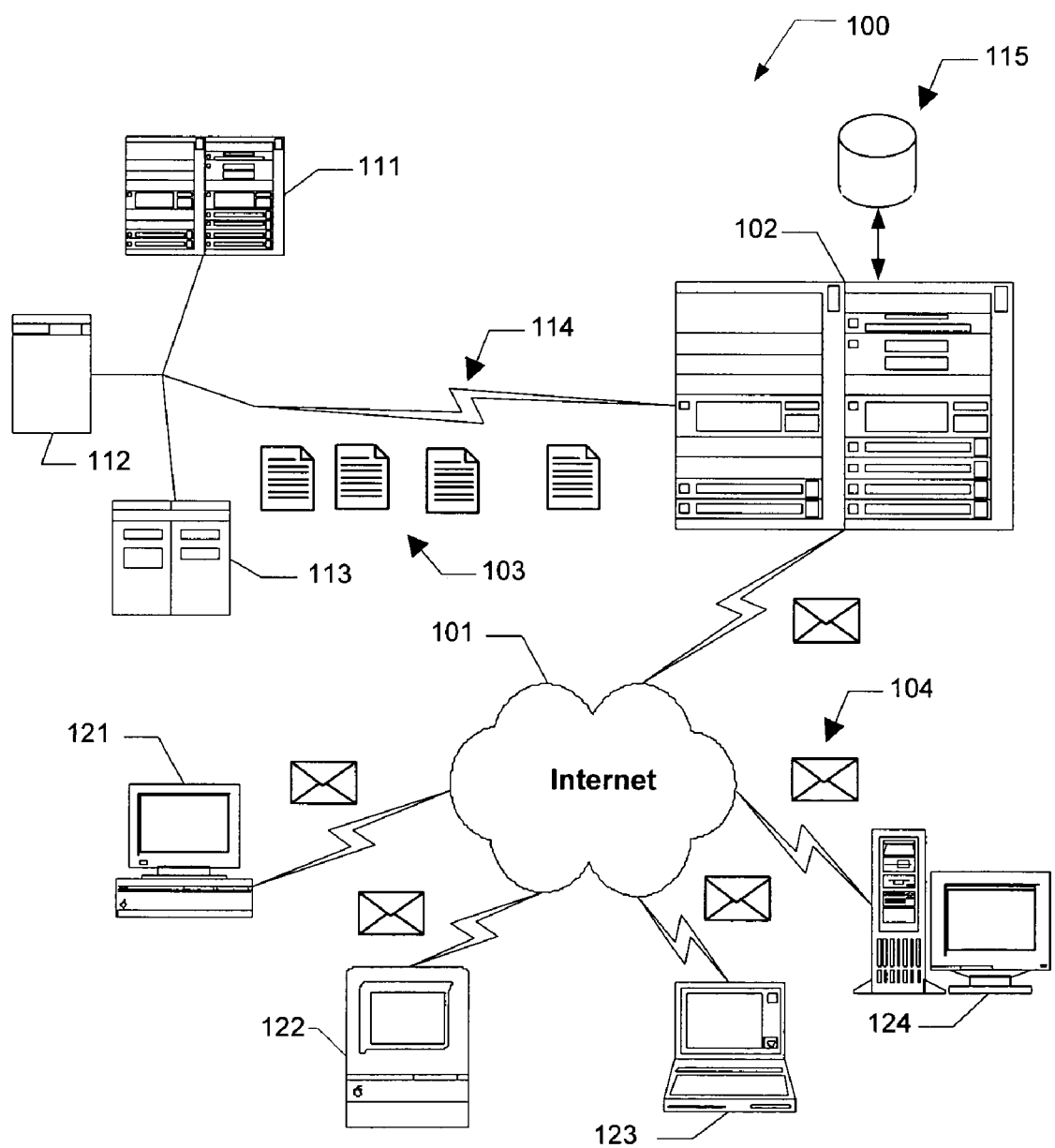
FIG. 1 illustrates a data publication-data subscription system using a broker server according to one embodiment of the present invention.

FIG. 1 illustrates a data publication-data subscription system using a broker server according to one embodiment of the present invention. A broker server computing system 102 is located at the center of the data publication-data subscription system 100. The broker system 102 receives a sequence of information messages 103 from one or more data publishing server computing systems 111–113. These data publishing servers 111–113 communicate with the broker server 102 over a communications link 114. This communication link may be a direct connection, a network connection or the Internet as the information messages 103 are simply transmitted from the publishing servers 111–113 to the broker server 102.

The broker server 102 applies the individual information request criteria for each subscribing user to the incoming sequence of information messages 103 to determine which information message is to be forwarded to each user as a subscription message 104. The broker server maintains a database of the subscribing users' information request criteria 115 that is used in this filtering process. In one embodiment, this filtering process is accomplished by the broker server 102 using an inverse query decision process that uses sub-expression implications between two or more of the subscribing users' information request criteria.

The subscription messages 104 are addressed and routed to each subscribing user's computing system 121–124 over a communications network. In the example embodiment, the communications network is the Internet 101 where the subscription message 104 is sent in the form of an electronic message, or e-mail. Other messaging techniques may be used without deviating from the spirit and scope of the attached claims where the individual subscription messages 104 are addressed and sent to individual subscribing user computing systems 121–124.

Figure 2:
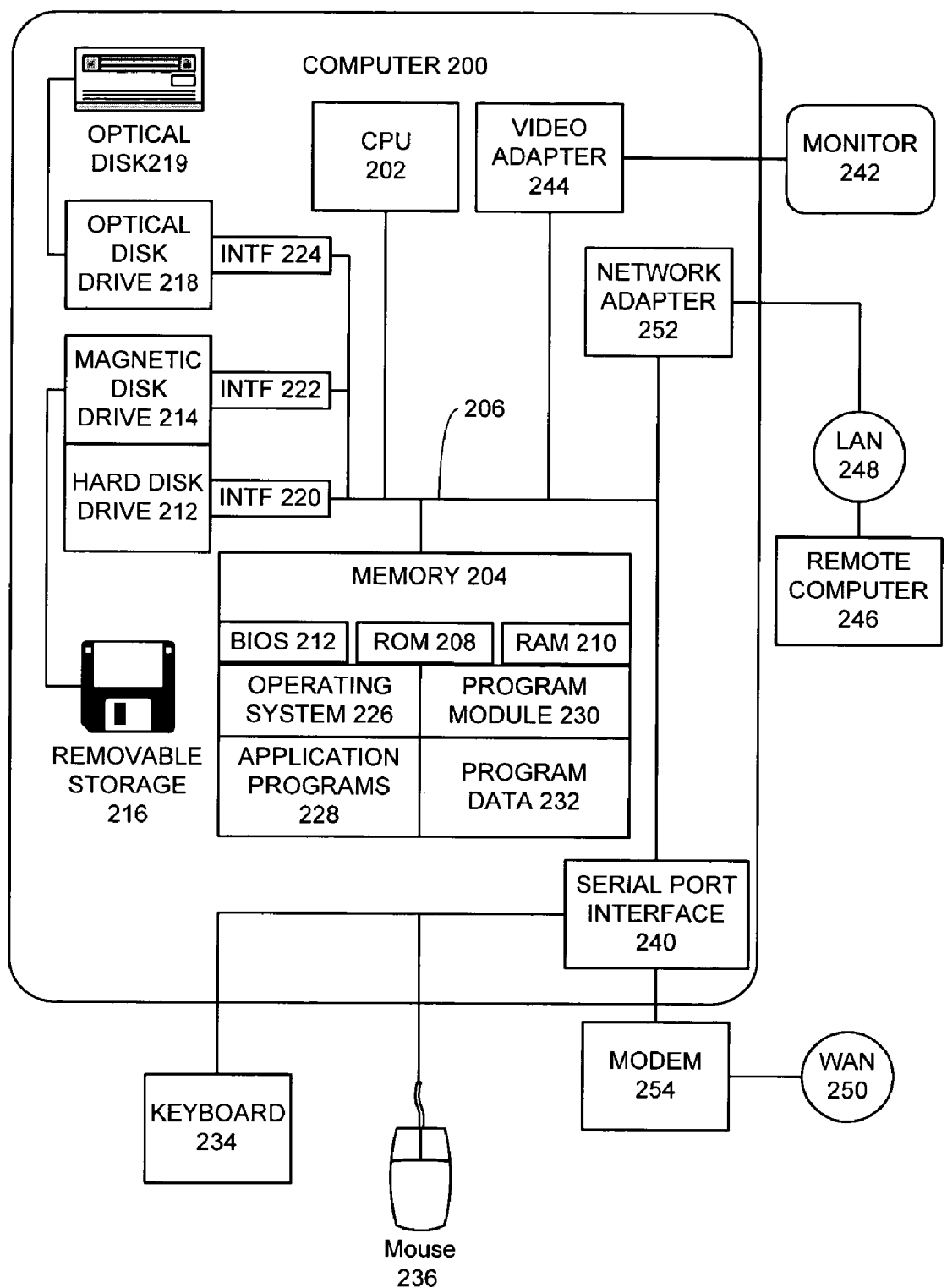
FIG. 2 illustrates a general purpose computing system for use in implementing as one or more computing embodiments of the present invention.

With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
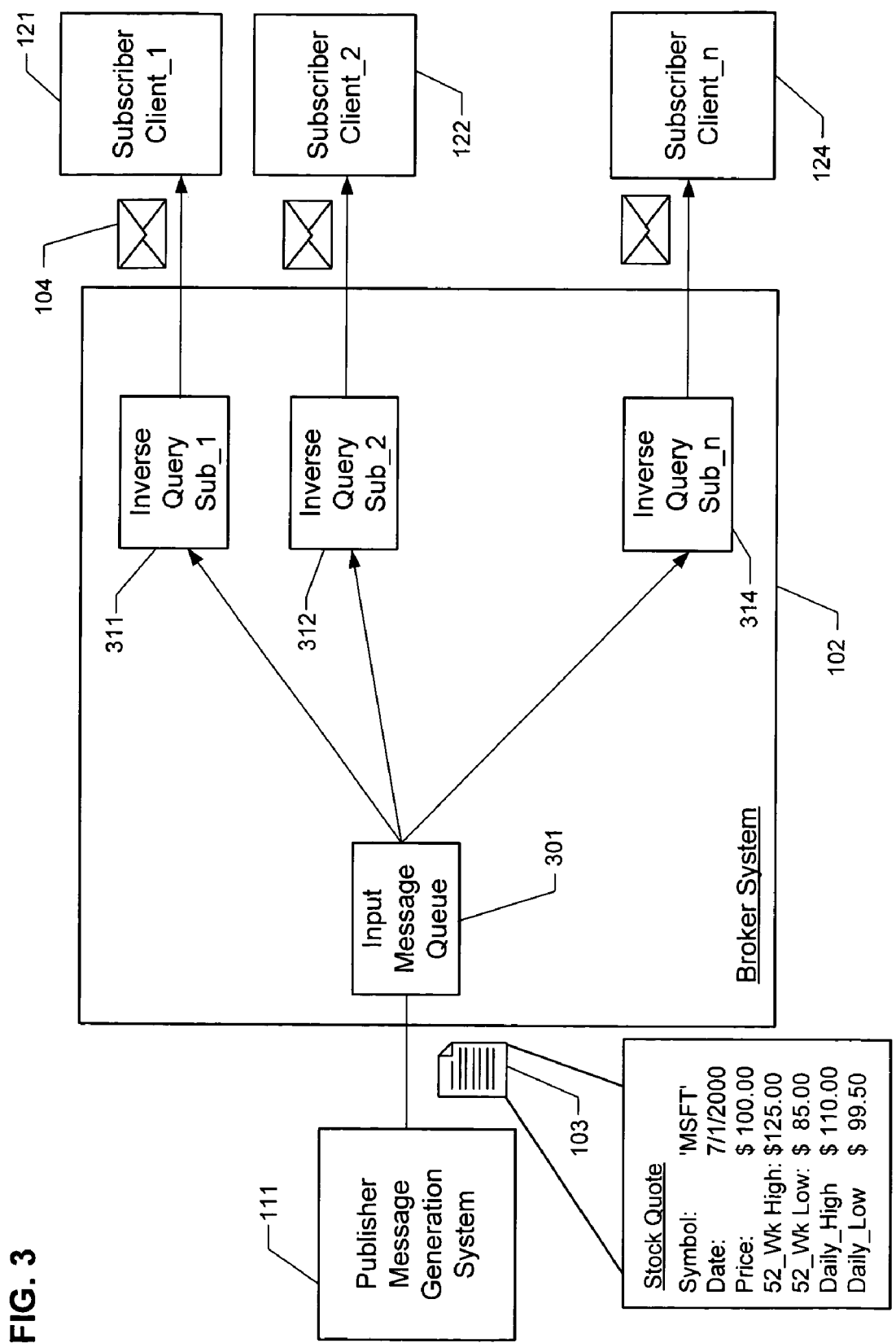
FIG. 3 illustrates a data publication-data subscription system using a broker server according to another embodiment of the present invention.

FIG. 3 illustrates a broker server computing system that is part of a data publication-data subscription system according to another embodiment of the present invention. The broker server 102 includes an input message queue module 301 and a plurality of inverse query subscription modules 311–314. The input message queue module 301 receives the sequence of information messages 103 from a publisher message generation system 111. In an example embodiment, the sequence of information messages 103 include stock quote data 302 such as a stock symbol, a date, a trade price, and one or more historical trade price figures. The stock quote data 302 is simply a data record containing a plurality of data fields that may contain any type of pre-defined data types such as character strings, numeric variables, and binary representations of data.

The sequence of information messages 103 are passed from the input message queue module 301 to a plurality of inverse query subscription modules 311–314 for processing.

Each of the inverse query subscription modules 311–314 processes the information request criteria for a single subscribing user to the pub/sub system. In the example embodiment shown in FIG. 3, inverse query subscription #1 module 311 applies a first information request criteria defined by a client subscriber #1 121. Similarly, inverse query subscription #2 module 312 applies a second information request criteria defined by a client subscriber #2 122 and inverse query subscription #n module 314 applies an nth information request criteria defined by a client subscriber #n 124. As discussed above, each of these information request criteria may be stored within a database 115.

Each of the inverse query subscription modules 311–314 applies the subscriber's information request criteria to the information 103. In the example embodiment that includes stock trade messages 302, the inverse query subscription modules 311–314 would apply a set of relational operators upon the values for the fields in the message 302. For example, the inverse query subscription modules 311–314 may attempt to match the stock symbol field for each stock of interest. If the stock symbol matches, an additional logical comparison may be made to the date and one or more of the price fields. The entire information request criteria may be expressed as a logical operation:

$$(Symbol=\text{``}MSFT\text{''}) \text{ AND } (Price>=\$95.00) \text{ AND } (Date>=01/01/2000) \quad (1)$$

Of course, the entire expression may be a sequence of logical expressions for individual stocks that are ORed together:

$$(MSFT \text{ AND Expression}) \text{ OR } (AAPL \text{ AND Expression}) \text{ OR } (IBM \text{ AND Expression}) \quad (2)$$

This expression may also be rewritten as:

$$(MSFT \text{ OR } AAPL \text{ OR } IBM) \text{ AND EXPRESSION} \quad (3)$$

As such, a message that relates to MSFT, APPL and IBM may be passed to a subscriber if the other terms of the sub-expressions are satisfied. Other stock quote messages would be filtered from being sent to this subscriber 121. Similar logical query evaluation processing is performed for each of the inverse query subscription modules 311–314.

The basic idea of the subscription process is to use subexpression implications to leverage commonality between subscriptions. Consider for example two subscriptions: S1=a>5 and b>3; S2=a>3 and B>1; where a and b are messages properties and "AND" is the usual boolean operator. A message is published that has a=10; b=10. By the moment that the subexpression a>5 is evaluated to true, it is possible to entail that a>3 is also true. Similarly, b>3 implies b>1. Also, since both operand of the first conjunction imply the operations of the second injunction, the subscription implies the second. This implication procedure can be applied to the request criteria of Eqs. 1–3 above.

This subscription process is coupled and enhanced by representing the above queries in if-then-else normal form (INF). A boolean expression represented in INF is called a binary decision diagram (BDD). BDDs use the if-then-else operator instead of OR and AND operators. The if-then-else operator is defined as follows:

$$\text{if}(x) \text{ then } y0 \text{ else } y1 = (x \text{ AND } y0) \text{ OR } ((\text{NOT } x) \text{ AND } y1) \quad (4)$$

Reduced ordered BDDs are a special form of BDDs that have no redundant common subexpression and where the variables appear on each path of the graph in a specific order.

Basically, a BDD is a graph that contains at each level tests on a different variable, and where the leaves are the truth values true and false. To evaluate a BDD, one simply starts at the root and each node takes a left or right branch depending on the truth of the test at that node. No backtracking is necessary and only one path is visited.

By evaluating a BDD in a single path, in addition to the ordering of predicates, the subscription process allows the use implications without requiring to fix the particular order between the queries. The subscription process is divided into two parts. The first part is executed when a new subscription is added to the system and constructs implication graph between the new query and queries already present in the system. The second part of the subscription process evaluates the queries against incoming messages. The evaluation of the BDD graphs corresponding to these queries is performed within the individual inverse query modules 311–314.

Figure 4:
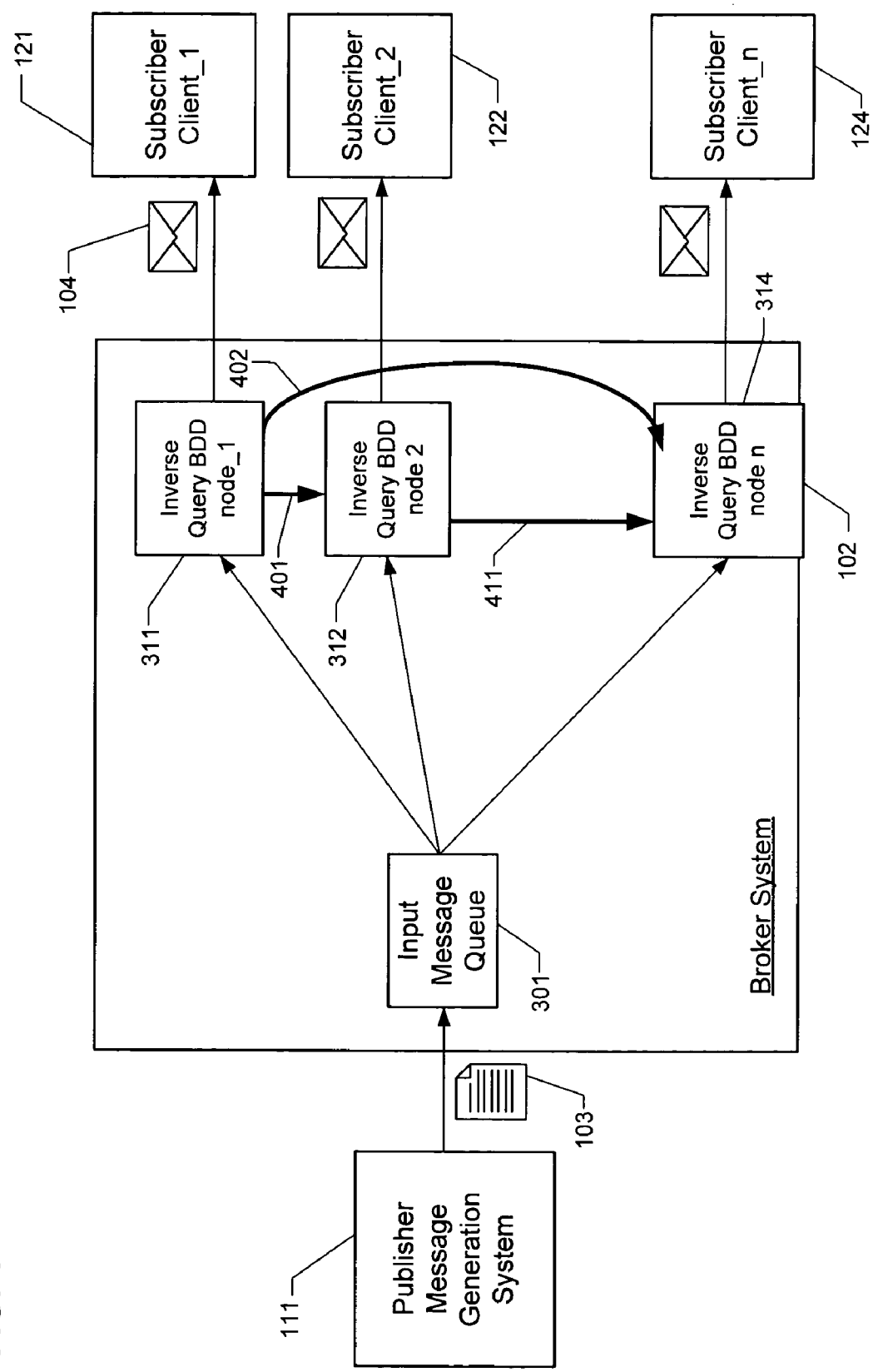
FIG. 4 illustrates a data publication-data subscription system using a broker server according to yet another embodiment of the present invention.

FIG. 4 illustrates a broker server computing system that is part of a data publication-data subscription system according to another embodiment of the present invention. Because the broker server computing system 102 has a plurality of inverse query subscription modules 311–314 as described above, processing of any given inverse query subscription module may be based upon a previously analyzed BDD nodes if the two BDD nodes are appropriately chosen. Consider an example in which a first information request criteria is defined:

(Symbol="*MSFT*") AND (Price>=$95.00) AND (Date>=01/01/2000)      (5)

Now consider the above criteria denoted as follows:

(A) AND (B) AND (C)      (6)

If a second information request criteria is defined:

(Symbol="*MSFT*") AND (Price>=$95.00) AND (Date>=02/01/2000)      (7)

which may also be expressed as follows:

(D) AND (E) AND (F)      (8)

One may notice that the sub-expression (A) AND (B) in Eq. 6 is identical to the sub-expression (D) AND (E) in Eq. 8. As a result, the sub-expression (D) AND (E) does not need to be re-evaluated when the second information request criteria is evaluated. If the broker server 102 simply references that the logical result of the sub-expression (A) AND (B) is used in place of the sub-expression (C) AND (D) in the second information request criteria, the processing associated with evaluating the second sub-expression is saved. When these two logical expressions are converted into BDDs, the sub-expressions for (A) AND (B) and for (D) AND (E), would generate implications that permit either BDD to be evaluated using the result of the previously evaluated BDD for the other BDD.

In FIG. 4, these results of the BDD evaluations are illustrated as intermediate results 401, 402, 411 that are communicated between the various inverse query modules 311–314. Because the inverse query modules may need to evaluate any number of BDD evaluations, and these BDD evaluations may be contained in many of these inverse query modules 311–314, the processing savings may be significant.

Figure 5:
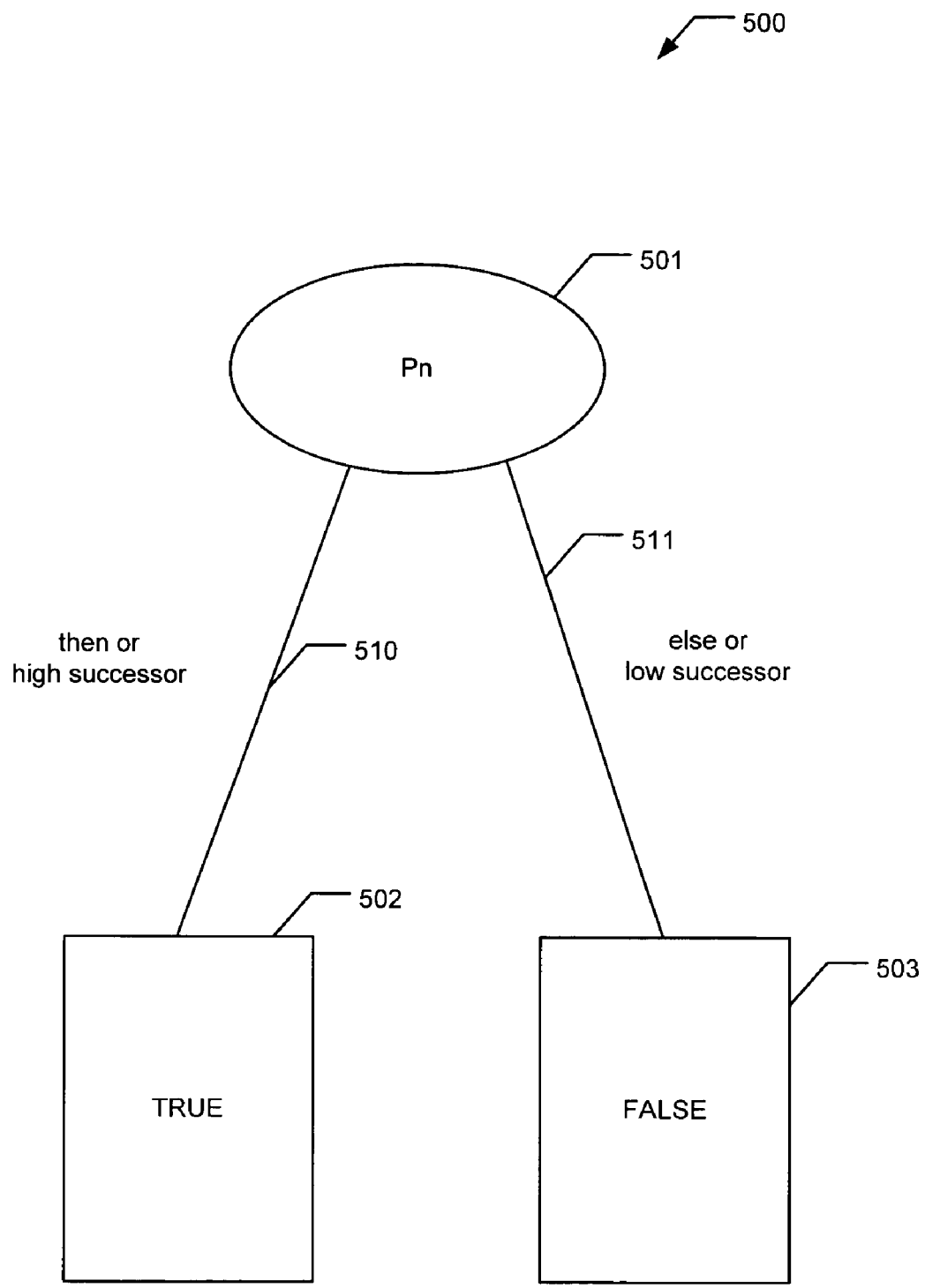
FIG. 5 illustrates a single BDD node with high and low successor edges to logical results according to one embodiment of the invention.

FIG. 5 illustrates a single BDD node with high and low successor edges to logical results according to one embodiment of the invention. The BDD node 501 is identified as Pn and has a high, or then, successor edge 510 which is taken when the result of the test for Pn is TRUE. The BDD node 501 also has a low, or else, successor edge 512 which is followed when the result of Pn is FALSE. The lower nodes, 502–503, in this example are simply logical results of TRUE or FALSE. These lower nodes 502–503 may also be additional BDDs having their own equations. The BDDs, however, always terminate in logical TRUE or FALSE which correspond to the result of the evaluation for the entire BDD.

The subscription process presented here requires that the BDDs are not reduced. In other words the BDDs must be trees, not graphs. The BDDs must be ordered a according to a global predicate order. Although no particular order is imposed, it's a good idea to keep predicates that tests the same variable adjacent in the ordering.

When referring to a BDD node 501, there are many concepts associated with the node:
     The node itself;
     The predicate tested at the node; and
     The subexpression computed by that node.

The subscription process uses the following symbols. Given a node denoted as N:
     P(N) is the predicate tested at node N; and
     e(N) is the subexpression computed by node N.

The subscription process also uses the following conventions:
     High (N) is the node corresponding to the then branch, also referred to as high successor;
     Low (N) is the node corresponding to the else branch, also referred to as low successor; and
     Parent (N) is the parent of node N. A node has a single parent since the BDDs are not reduced; and
     Path (N) is the set of nodes in the path from the root to node N.

Given the BDD node M, and node X in path (M), the subscription process defines a precondition of M at X, and denote it as pre(M,X), as follows:
     If M is high (X) or a descendant of high (X), then pre(M,X)=P (X).
     If M is low (X) or a descendant of low (X), then pre (M, X)= !P (X).

The subscription process now considers the conjunction, or the logical AND, of the predicate pre(M, X) for every X in path (M). The resulting predicate is called the precondition of node M, and it is denoted with pre(M).

$$\operatorname{Pre}(M) = \underset{X\ \in\ \operatorname{path}(M)}{\operatorname{AND}} \operatorname{pre}(M, X) \quad\quad (9)$$

The interpretation of pre(M) is straightforward. The subscription process reaches node M while evaluating the BDD if and only if pre (M) is true.

Figure 6:
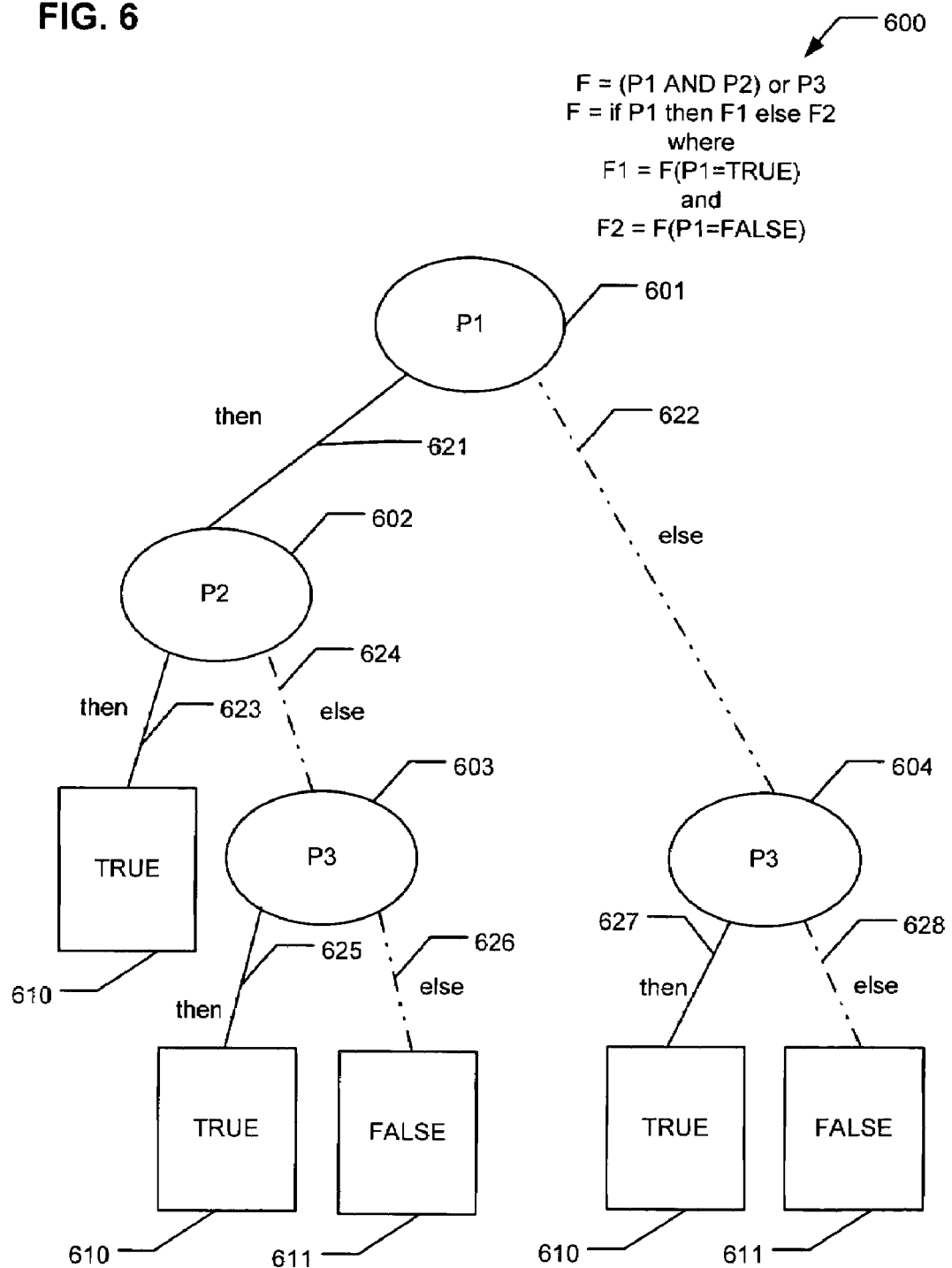
FIG. 6 illustrates a single BDD diagram for a logical expression according to another embodiment of the present invention.

FIG. 6 illustrates a single BDD diagram for a logical expression according to another embodiment of the present invention. Consider logical expression 600:

F=(P1 AND P2) or P3.      (10)

This expression 600 may be rewritten as:

F=if P1 then F1 else F2      (11)

where F1 is F evaluated with P1 being TRUE and F2 is F evaluated with P! being FALSE.

This logical expression may be expanded into the set of BDD nodes shown in FIG. 6 where the expansion process is well known in the art.

In order to evaluate F 600, an evaluation process starts at P1 601 and evaluates the predicate corresponding to P1. If the result of the evaluation is TRUE, the then edge 621 is followed to BDD P2 602. And the process repeats for BDD P2. Similarly, if the result of the evaluation of P1 is FALSE, the else egde 622 is followed to BDD node P3 604. Again, the process repeats for BDD node P3 604. The entire evaluation processing continues until either a TRUE 610 or FALSE 611 node is reached. The evaluation of the expression F 600 will occur using the BDD tree for all values of P1, P2, and P3.

Figure 7:
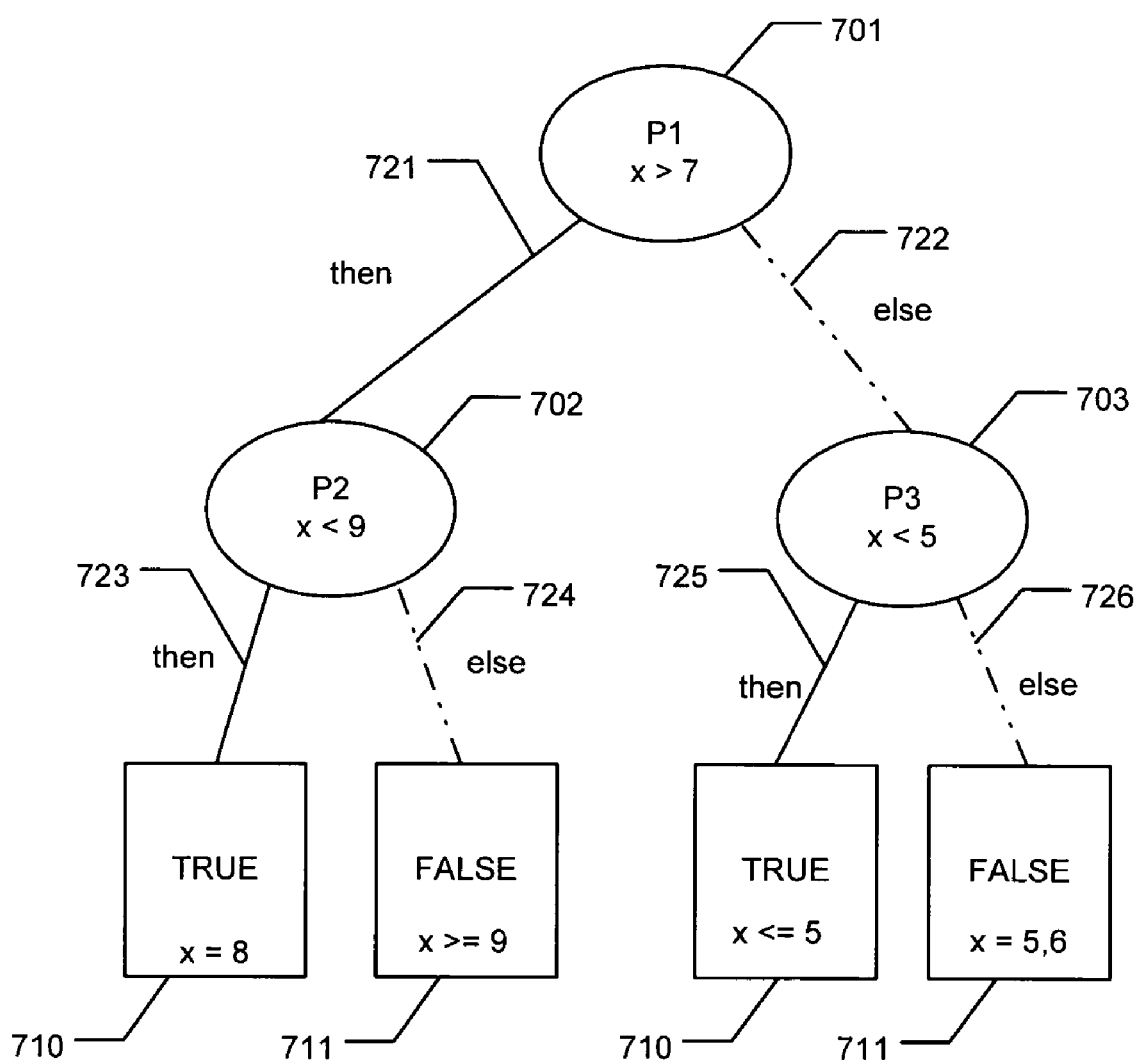
FIG. 7 illustrates another example of a BDD tree for a single variable x according to an embodiment of the present invention.

FIG. 7 illustrates another example of a BDD tree for a single variable x according to an embodiment of the present invention. The example BDD tree consists of three nodes 701–703 in which a different expression of variable x is contained within each node 701–703. For any value of x, say x=12, a single path for either TRUE 710 or FALSE 711 exists. For x=12, the path goes from node P1 to P2 using then edge 721 and then from P2 to FALSE using else edge 724. For X=2, a different path from P1 to P3 using else edge 722 followed by the then edge 725 to TRUE 710. Any set of expressions may be easily evaluated using this process.

Implications can be used within a single query to simplify the query. Redundant nodes in BDDs are not always the result of an error by the user. This is a consequence of the fact that normalization into INF treats each predicate as independent from the others, not considering implications.

As an example, the expression:

$$\text{If } (X=3) \text{ then } (\text{If } (X=5) \text{ then } S1 \text{ else } S2) \tag{12}$$

can be simplified as if (X=3) then S2.

In general if a node M has an implication relationship with its successor N, we can remove N and make M point to a successor of N, if the implication is concordant with the relationship between M and N. The following root rules are used:

$$\text{if } N=\text{high}(M): \tag{14}$$

$$\text{if } p(M)=>p(N), \text{ remove } N \text{ and set high}(M) \text{ to high}(N); \tag{15}$$

$$\text{if } p(M)=> !p(N), \text{ remove } N \text{ and set high}(M) \text{ to low}(N). \tag{16}$$

$$\text{if } N=\text{low}(M): \tag{17}$$

$$\text{if } !p(M)=>p(N), \text{ remove } N \text{ and set low}(M) \text{ to high}(N); \tag{18}$$

$$\text{if } !p(M)=> !p(N), \text{ remove } N \text{ and set low}(M) \text{ to low}(N). \tag{19}$$

Figure 8:
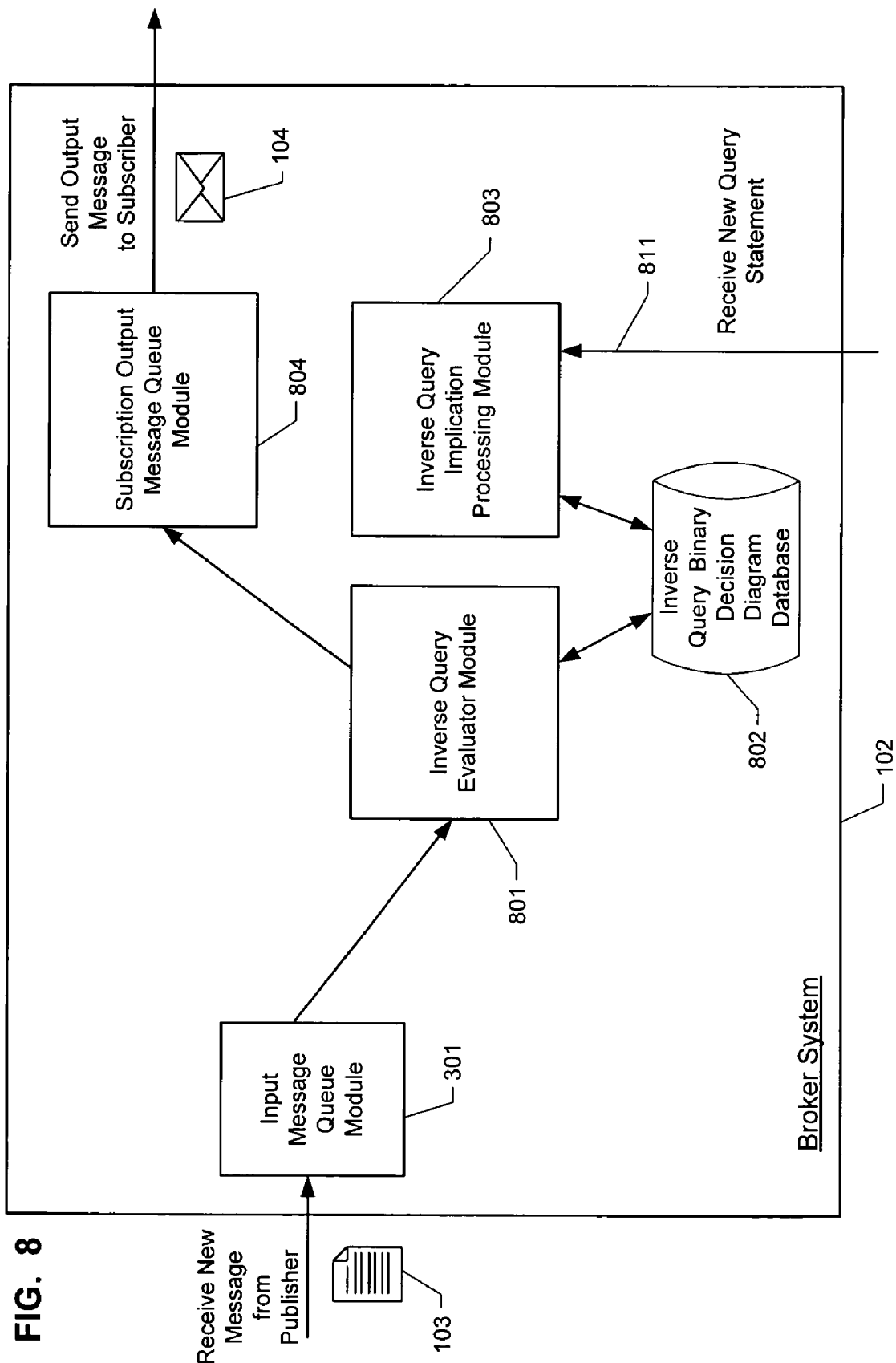
FIG. 8 illustrates a broker processing system implementing an example embodiment of the present invention.

FIG. 8 illustrates a broker processing system implementing an example embodiment of the present invention. A broker server 102 receives a new message 103 from a publisher server into an input message queue module 301. The messages are sent to an inverse query BDD evaluator module 801. The inverse query BDD evaluator module 801 evaluates all of the queries for all subscribing users using the data from the incoming message 103. The inverse query BDD evaluator module 801 obtains all of these queries from an inverse query binary decision graph database 802. The inverse query BDD evaluator module 801 sends the message 103 to a subscription output message queue module 804 with the address or other identifying information for a subscribing user if the data from the message 103 satisfies the query for the subscribing user.

The subscription output message queue module 804 transmits the outgoing message 104 to a subscribing user.

The broker server 102 receives a new query statement 811 for a subscribing user in an inverse query implication processing module 803. The inverse query implication processing module 803 adds the new query to the end of the ordered sequence of queries to be evaluated using incoming message data 103. The new query is added to the inverse query binary decision graph database 802. The inverse query implication processing module 803 next identifies any implications between existing queries and the new query as discussed above and adds these graphs to the data stored within the database 802 associated with the new query.

The process of identifying new implications and adding implications to a decision tree or graph may be performed as a background processing task that operates in parallel with the evaluation of incoming messages 103 against the queries in the database 802. The fact that a new query has been added to the database 802 allows the new query to be used immediately. If all of the useful implications between existing sub-expression nodes in the database 802 and the new query have not been identified and added to the new query when the new query is evaluated, a proper evaluation of the new query will still occur. Of course, the failure to identify possible implications that may be used will simply cause additional processing to evaluate all of the sub-expressions within the new query to be performed even though this processing may have been avoided using an implication from a previously processed sub-expression. When the inverse query implication processing module 803 has completed the process of identifying useful implications and adding these implications to the graph, all subsequent evaluations of the new query will use these implications rather than evaluate the sub-expressions directly.

The inverse query implication processing module 803 receives two queries S1 and S2, in their ordered BDD representation. The predicates in the two BDDs must follow the same order. No evaluation order is fixed between queries S1 and S2. First inverse query implication processing module 803 finds implications from S1 to S2, and then switch the queries and find implications in the opposite direction. Because the process is identical, only the first part is shown.

The goal of the processing by this module 803 is to find, for each node X and S1, the lowest, according to predicate order, node Y of S2 for which pre (X)=>pre(Y). For convenience, node Y is called the target of X and denoted as t(X). If, at evaluation time, node X is reached, the processing within the module 803 knows that pre(X) is true, and, for the implication, that pre (Y) is true. Therefore S2 can be computed by e(Y).

The construction of the BDD implication graph is pretty straightforward. The processing in module 803 recursively visits the nodes within S1 in pre order. While processing each node, module 803 keeps track of the can precondition and target of the current node X. The processing performs the following:

1. Initially, X is the root of S1. pre(X) is empty (true). t(X) is the root of S2.
2. The low and high successor children of X are recursively visited. Let X' be one of successors, the reasoning is identical for the high and low successors.
3. Pre(X') pre(X)∩pre(X',X)
4. The target t(X) is computed. Pre(X') implies pre(X), which in turn implies pre(t(X)). The processing in module 803 determines if the additional predicate pre (X', X) implies some predicates of the S2 that are not in pre(t(X)). To do that, the processing starts with Y=t(X) and a iterate through the following steps:
a. if pre(X', X)=>p(Y) then Y is set to high(Y) and the processing iterates;
b. if pre(X', X)=> !p(Y) then Y is set to low(Y) and the processing iterates; and
c. if neither of the above implications holds, t(X')=Y.

As a target t(X) for every node X and S1 is found, the processing within module 803 annotates the two BDDs with an implication edge from X to t(X) only if t(X) is lower than X according to the predicate order. This final condition is included to maximize the effectiveness of the evaluation processing.

Given the BDD implication graph construction processing described above, one sees that BDDs must not be reduced: If they were not reduced, there would be no single path from the root of the graph to a node and hence there would be no single precondition to any node.

Figure 9:
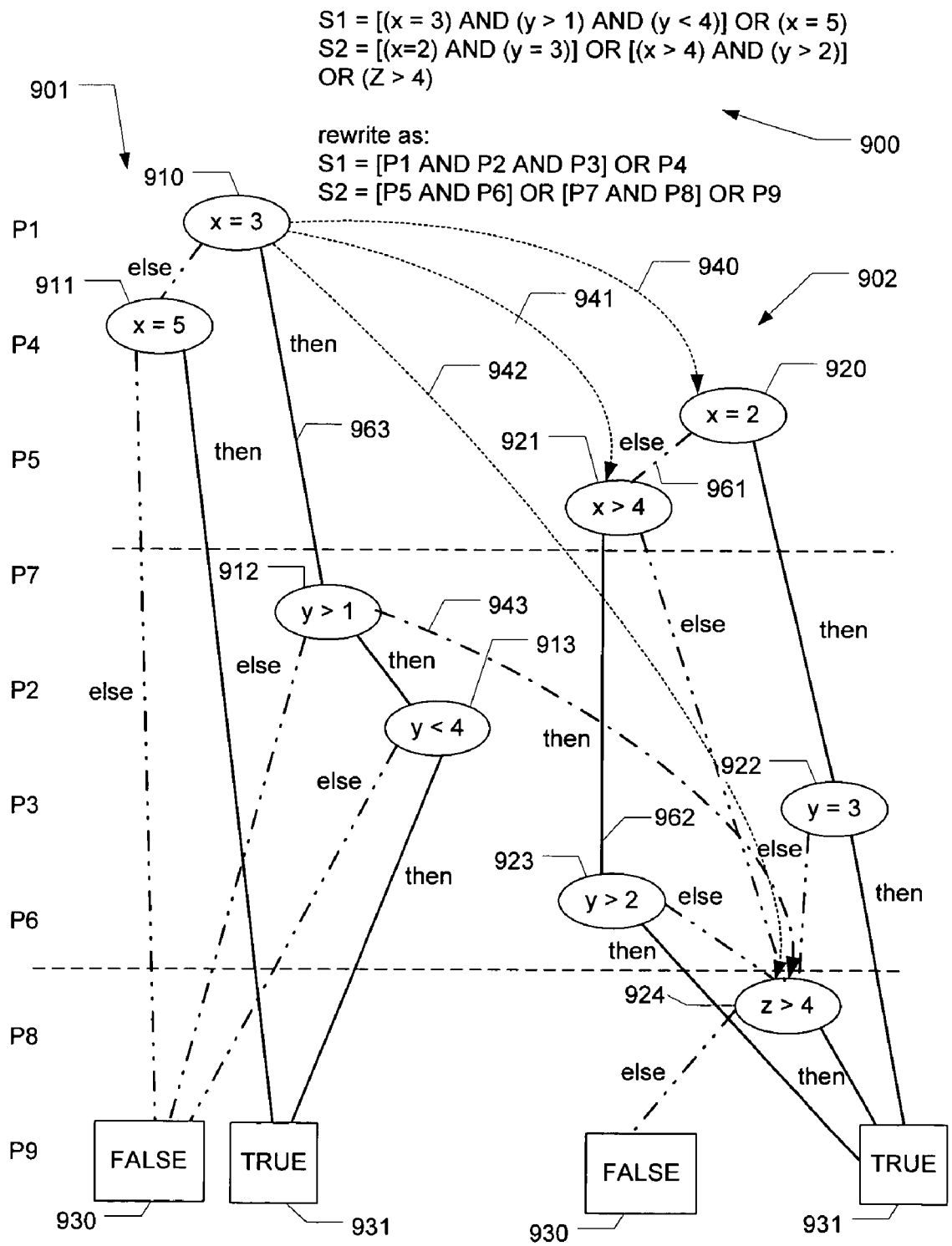
FIG. 9 illustrates a pair of BDD trees corresponding to two subscription expressions that permit the use of implications according to an embodiment of the present invention.

FIG. 9 illustrates a pair of BDD trees corresponding to two subscription expressions that permit the use of implications according to an embodiment of the present invention. Consider the two expressions 900:

$$S1=[(x=3) \text{ AND } (y>1) \text{ AND } (y<4)] \text{ OR } (x=5) \quad (20)$$

$$S2=[(x=2) \text{ AND } (y=3)] \text{ OR } [(x>4) \text{ AND } (y>2)] \text{ OR } (Z>4) \quad (21)$$

Rewrite these expression as:

$$S1=[P1 \text{ AND } P2 \text{ AND } P3] \text{ OR } P4 \quad (22)$$

$$S2=[P5 \text{ AND } P6] \text{ OR } [P7 \text{ AND } P8] \text{ OR } P9. \quad (23)$$

Organize the nodes such that the nodes having expressions based upon x, P1 910, P4 911, P5 921, and P7 922 are placed together. Similarly, organize the nodes such that the nodes having expressions based upon y, P2 910, P3 911, P6 921, and P8 922 are placed together, and the nodes having expressions based upon z, P9 924 are placed together. Construct the then edges and else edges to represent the BDD trees for S1 and S2 as shown in FIG. 9.

Now start with node P1 910, which is the highest node in S1 and compare it with P5 920. By comparing the expressions based upon x in P1 and P5, implications may be made. If P1 is true, then x must equal 3. As a result, x cannot also equal 2 and P5 must be FALSE.

If the process starts with an implication 940 from P1 910 to P5 920, the above evaluation of x=3 and P1 910 being TRUE, leads to the implication that P1 910 implies that S2 will reach P7 using else edge 961. This implication is the indicated with implication edge 941. The process can be repeated as if x=3 for this situation, then P7, x>4 must be FALSE. As a result, the else edge 942 will be followed when S2 is evaluated. Thus, P1 being TRUE implies S2 may be evaluated simply by evaluating P9 924, as indicated using implication edge 942.

Finally, because P1 was evaluated as TRUE, the evaluation of S1 will follow then edge 963 to P2 912. Therefore, P2 912 will imply P9 924 as indicated by edge 943. This process will repeat for values of y and then all other variables in expressions S1 and S2.

In general, the evaluation process keeps track, for each subscription, of the current node that evaluates the subscriptions. The current nodes are kept in a rank ordered according to predicate order, so that the first element of the rank is always the highest node according to predicate order.

1. Initially, the current node for each subscription is the root of that subscriptions.
2. The evaluation process iterates until the rank is empty. At each step, the evaluation process extracts the first element of the rank. Let this node be called X.
   A. If X is a leaf node, which is true or false, the evaluation process marks the subscriptions as decided and goes back to step 2.
   B. Otherwise, the evaluation process evaluates p(X). If p(X) is true we consider X'=high(X), otherwise we consider X'=low(X). The evaluation process inserts X' in the rank. The evaluation process also visits the targets of X'. For each target Y, the process compares the target with the current node Z for the same subscription that Y as part of. If Y is lower than Z according to predicate order, the evaluation process updates the current node for that subscription to be Y.

This evaluation process visits the entire set of BDD nodes breadth first, consistently moving down the frontier of current nodes. At each step, the evaluation process considers the highest node of the frontier and evaluates the predicate at the node. Evaluating the predicate determines for the process which node will be the next node to evaluate for the current subscription. The evaluation process also can use all implications concordant with the result of the predicate to take shortcuts in evaluating other subscriptions. The evaluation process does not always take a shortcut, as target subscription could already be in a more advanced state of decision. The evaluation process terminates when the count of elements in the rank reaches zero, which means that all the subscriptions are decided. Partial results, some subscriptions been decided, can also be emitted as these results are obtained. The rank can be implemented using a sorted list, or a heap. The heap achieves both removal of the highest element in the rank and insertion of a new element in logarithmic time.

Figure 10:
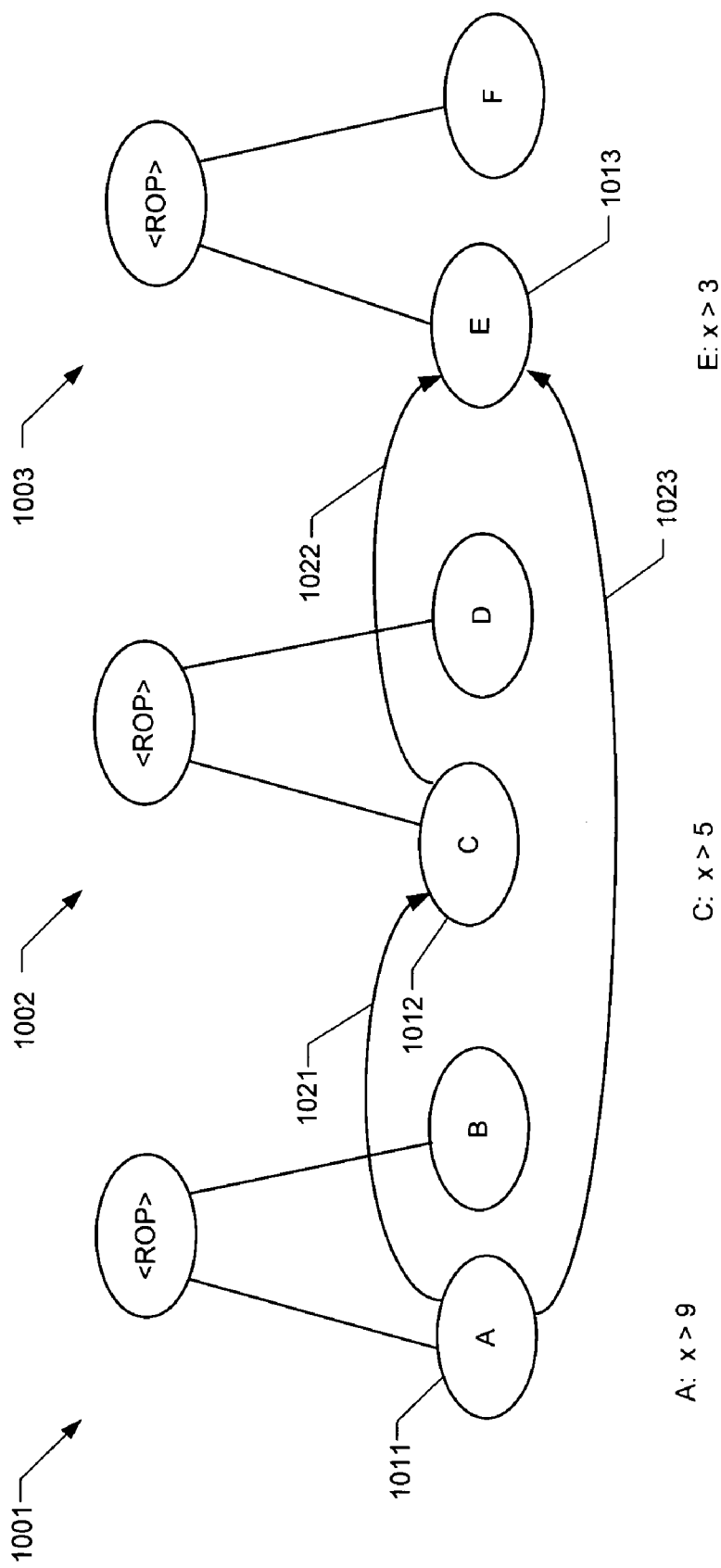
FIG. 10 illustrates possible inferences between a plurality of decision trees according to an embodiment of the present invention.

FIG. 10 illustrates possible inferences between a plurality of BDDs according to an embodiment of the present invention. The above discussion has always involved two syntax trees in which implication edges are added. When this process is extended to a plurality of queries additional processing is needed as multiple implication paths between two nodes may arise.

Consider a set of expressions X1, X2, ... Xn that exist between n different queries. From these expressions, consider when X1=>X2=> . . . =>Xn. From the transitivity property, an implication Xi=>Xj exists between all possible couples of Xi and Xj where i<j. From this fact, the number of resulting edges would be n*(n+1) and the number of paths would be of the order of 2^n.

This situation is easily demonstrated with the following example illustrated in FIG. 10. Consider three syntax graphs 1001–1003, each containing a node using a predicate of X. Node 1011 contains A in which A:X>9. Node 1012 contains C in which C:X>5. Node 1013 contains E in which E:X>3. From these nodes a set of implication edges may be found. These edges include:

$$A => C \; \mathbf{1021} \quad (24)$$

$$C => E \; \mathbf{1022} \quad (25)$$

$$A => E \; \mathbf{1023} \quad (26)$$

From these three implications, an implication from A 1011 to E 1013 may be found using either the two implications 1021–1022 from A 1011 to C 1012 and from C 1012 to E 1013 or the implication 1023 directly from A 1011 to E 1013.

Only one of these edges are needed and desired in an implication graph according to the present invention.

Once again consider a set of expressions X1, X2, ... Xn that exist between n different queries. From these expressions, consider when X1=>X2=> ... =>Xn. An implication chain is defined to be minimal if and only if for each couple of adjacent expressions Xi and Xi+1 in the chain, no expression Xk different from both Xi and Xi+1 exists in the graph for which Xi=>Xk=>Xi+1. When all of the paths in an implication graph constitute minimal implication chains, the graph itself is defined to be non-redundant. A non-redundant graph is used by the present invention to eliminate multiple paths between nodes.

The construction process, as discussed above, is easily extended to the general case of multiple queries, by detecting implications between all possible couples. Note that the use of implications is a pure optimization, in that the correctness of the algorithm is preserved whether we use implications or not. For this reason, the construction process may insert a new query in the set of other queries as soon a new query is received and start evaluating it right away. Implications can be detected and denoted by a lower priority thread.

The construction process must avoid treating redundant implication edges that result from implication transitivity. This means that if pre(A) implies pre(B) implies pre(C), we must avoid treating implication edge for pre (A) implies pre (C).

Figure 11:
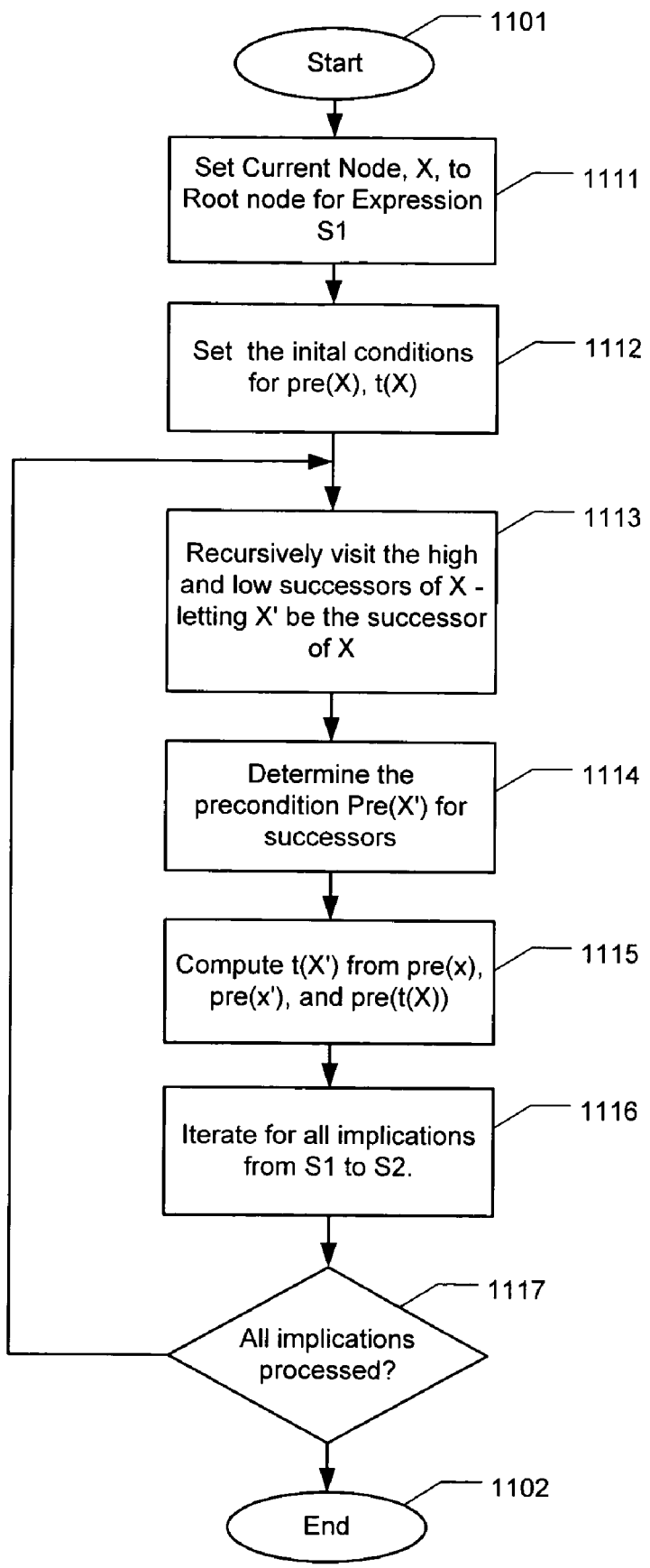
FIG. 11 illustrates an operational flow for the construction of an implication graph within a broker processing system according to an embodiment of the present invention.

FIG. 11 illustrates an operational flow for the construction of an implication graph within a broker processing system according to an embodiment of the present invention. The construction process begins 1101 and proceeds to an initialization module 1111 which sets a current node X to an initial value equal to the root node of expression S1. Next, a precondition module 1112 sets initial conditions for expressions pre(X) and t(X). Once these values are initialized, a traverse module 1113 moves the current node being considered to the next module to be evaluated in the graph using a recursive traversal of the graph. After moving to the next node, a determination module 1114 determines the value for pre(X') for each successor as discussed above in regards to FIGS. 5–7. A Computation module 1115 also computes the value of t(X') from pre(x), pre(x) and pre(t(x)) as also discussed above. Once these values are completed, the processing considers all iterations from expression S1 to S2 in iteration module 1116. If all implications are not processed, test module 1117 controls whether the processing continues by returning to the traverse module 1113 to process the next implication or whether the processing ends 1102.

Figure 12:
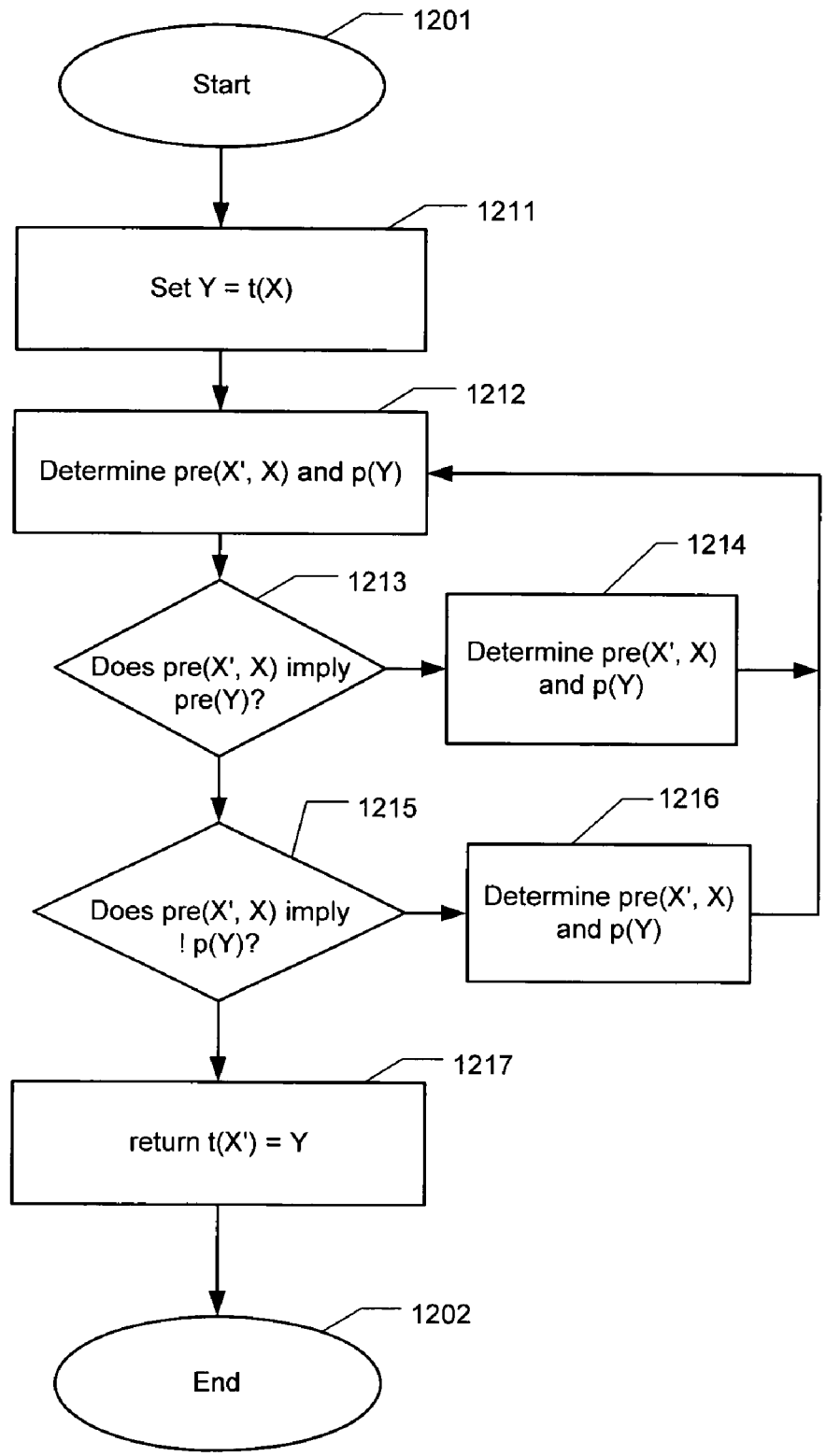
FIG. 12 illustrates a sequence of processing instructions for the determining the value for the expression for a target of an implication as used in the construction of an implication graph using a follow procedure according to an embodiment of the present invention.

FIG. 12 illustrates a sequence of processing instructions for determining the value for the expression for a target of an implication as used in the construction of an implication graph using a follow procedure according to an embodiment of the present invention. The expression determination processing begins 1201 and proceeds to an init module 1211 that sets Y equal to t(x). Next, a eval module 1212 evaluates the expressions pre(X',X) and pre(Y) as discussed with regards to FIGS. 5–7. If test module 1213 determines that the value of pre(X',X) implies pre(Y), then the processing proceeds to high successor module 1214. The high successor module sets the current value of Y equal to its high successor high(Y) and the processing iterates by returning to eval module 1212.

If test module 1213 determines that the value of pre(X',X) does not imply pre(Y), the processing continues with test module 1215. If test module 1215 determines that the value of pre(X',X) implies ! pre(Y), then the processing proceeds to low successor module 1216. The low successor module sets the current value of Y equal to its low successor low(Y) and the processing iterates by returning to eval module 1212. If test module 1215 determines that the value of pre(X',X) does not imply ! pre(Y), the processing continues with return module 1217 that returns a value of t(X') being equal to the current value of Y before the processing ends 1202.

Figure 13:
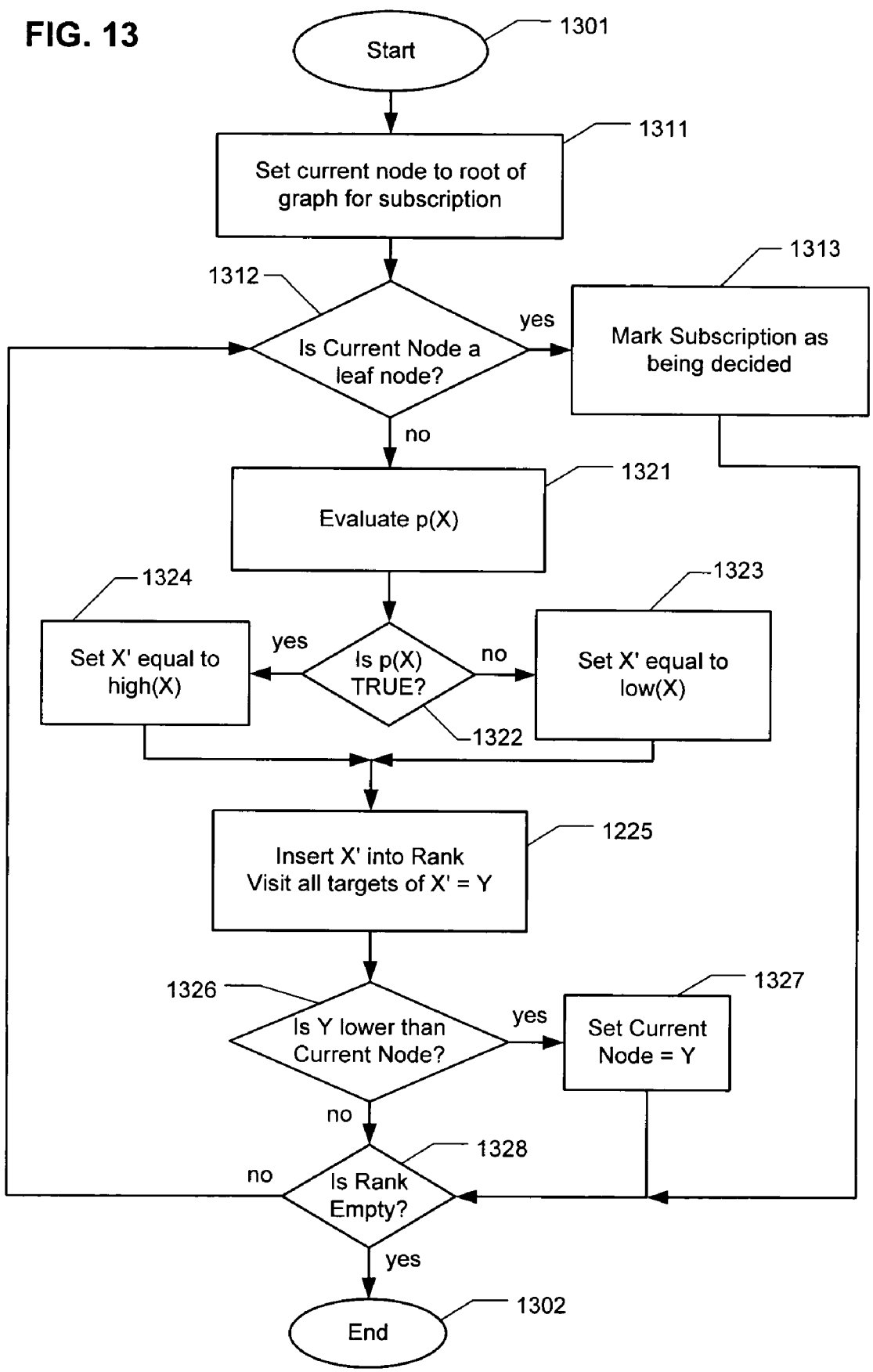
FIG. 13 illustrates an operational flow for implication graph node evaluation using implications between binary decision diagram nodes according to another embodiment of the present invention.

FIG. 13 illustrates a sequence of processing instructions for implication graph node evaluation using implications between sub-expression nodes in decision trees according to an embodiment of the present invention. The evaluation processing begins 1301 and proceeds to an init module 1311. The init module 1311 sets the initial value for the current node to the root node for an implication graph for each subscription. The processing proceeds to test module 1312 to determine of the current node is a leaf node. If test module 1312 determines that the current node is a leaf node, the processing proceeds to a marking module 1313 that marks the subscription as being decided using the value of the leaf node. Then the processing proceeds to determine if the rank of the processing is empty in test module 1328. If the test module 1328 determines the rank is empty, the processing ends 1302. If test module 1328 determines that the rank is not empty, the processing returns to test module 1312 to continue the processing for other entries within the rank.

If the test module 1312 determines that the current node is not a leaf node, the processing proceeds to an eval module 1321 that evaluates the expression for p(X). Test module 1322 uses the value determined in eval module 1321 to test if the value of p(X) is true. If the value of p(X) is true, the processing proceeds to a set high module 1324 that sets the value of X' equal to the high successor of X high(X). If the value of p(X) is false, the processing proceeds to a set low module 1323 that sets the value of X' equal to the low successor of X low(X). Once the value for X' is set by either of the above modules, the processing continues to an insert rank module 1325 to insert the value of X' into the rank of the process. The insert rank module 1325 then visits all targets of X'=Y.

Once the targets are visited, test module 1326 determines if Y is lower than the current node. If test module 1326 determines that Y is lower than the current node, processing proceeds to current node module 1327 to set the current node equal to Y before proceeding to test module 1328. If test module 1326 determines that Y is not lower than the current node, processing proceeds directly to test module 1328. As discussed above, test module 1328 determines if the rank is empty to determine whether the processing should return to test module 1312 to continue the processing or whether the processing should end 1302.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a method, apparatus, and article of manufacture for providing a publication/subscription process for transmitting selected information to individual subscribing users from a larger set of information based upon individually specified criteria.

What is claimed is:

1. A method for filtering one or more messages for transmission to a subscriber computing system according to an individual information request criteria, the method comprising:

constructing a binary decision diagram implication graph for each individual information request criteria specified for each subscriber, the binary decision diagram implication graph including a plurality of nodes expressing each information request criteria in an if-then-else normal form, the nodes being evaluated until a logical true or false node is reached;

identifying logical implications from one or more nodes in a binary decision diagram from a first information request criteria to one or more corresponding binary decision diagrams within a second information request criteria;

receiving one or more messages to be filtered;

evaluating a first information request criteria based upon information within the received messages;

evaluating one or more information request criteria based upon information within the received messages using the identified logical implications between one or more binary decision diagrams within the information request criteria being evaluated and one or more binary decision diagrams previously evaluated; and transmitting the received message to the subscriber computing system corresponding to an information request criteria evaluated to be satisfied by information contained within the received message.

2. The method according to claim 1, wherein the constructing step further comprises:

recursively visiting the high and low successors for each node in the binary decision diagrams;

while visiting each node, determine the precondition pre(X') for each successor and compute the target t(X') for all visited nodes and apply permissible implications; and iterate the processing for all implications.

3. The method according to claim 2, wherein permissible implications for a node M with successor node N include:

if node N is equal to the high successor high(M), and
if p(M) implies p(N), then remove N and set the high(M) equal to high(N); and
if p(M) implies ! p(N), then remove N and set high(M) equal to low(N).

4. The method according to claim 2, wherein permissible implications for a node M with successor node N include:

if node N is equal to the low successor low(M), and
if ! p(M) implies p(N), then remove N and set the low(M) equal to high(N); and
if ! p(M) implies ! p(N), then remove N and set low(M) equal to low(N).

5. The method according to claim 4, wherein the evaluating steps further comprises:

determining if a current node is a leaf node in the binary decision diagram;

if the current node is a leaf node, marking the information request criteria as being decided and returning the value of the current node;

if the current node is not a leaf node, determining a value of the expression for the node p(X);

if the value of the expression of the node is true setting X'=high(X) otherwise X'=low(X);

inserting X' into the rank; and visiting the targets of node X' to compare the current node with the target node;

if the target node is lower than the current node according to a predicate order, update the current node.

6. A computer program product readable by a computing system and encoding instructions for filtering one or more messages to be transmitted to a subscriber computing system according to an individual information request criteria, the computing process comprising:

constructing a binary decision diagram implication graph for each individual information request criteria specified for each subscriber, the binary decision diagram implication graph including a plurality of nodes expressing each information request criteria in an if-then-else normal form, the nodes being evaluated until a logical true or false node is reached;

identifying logical implications from one or more nodes in a binary decision diagram from a first information request criteria to one or more corresponding binary decision diagrams within a second information request criteria;

receiving one or more messages to be filtered;

evaluating a first information request criteria based upon information within the received messages;

evaluating one or more information request criteria based upon information within the received messages using the identified logical implications between one or more binary decision diagrams within the information request criteria being evaluated and one or more binary decision diagrams previously evaluated; and transmitting the received message to the subscriber computing system corresponding to an information request criteria evaluated to be satisfied by information contained within the received message.

7. The computer program product according to claim 6, wherein the constructing step further comprises:

recursively visiting the high and low successors for each node in the binary decision diagrams;

while visiting each node, determine the precondition pre(X') for each successor and compute the target t(X') for all visited nodes and apply permissible implications; and iterate the processing for all implications.

8. The computer program product according to claim 7, wherein permissible implications for a node M with successor node N include:

if node N is equal to the high successor high(M), and
if p(M) implies p(N), then remove N and set the high(M) equal to high(N); and
if p(M) implies ! p(N), then remove N and set high(M) equal to low(N).

9. The computer program product according to claim 7, wherein permissible implications for a node M with successor node N include:

if node N is equal to the low successor low(M), and
if ! p(M) implies p(N), then remove N and set the low(M) equal to high(N); and
if ! p(M) implies ! p(N), then remove N and set low(M) equal to low(N).

10. The computer program product according to claim 7, wherein the evaluating steps further comprises:

determining if a current node is a leaf node in the binary decision diagram;

if the current node is a leaf node, marking the information request criteria as being decided and returning the value of the current node;

if the current node is not a leaf node, determining a value of the expression for the node p(X);

if the value of the expression of the node is true setting X'=high(X) otherwise X'=low(X);

inserting X' into the rank; and visiting the targets of node X' to compare the current node with the target node;

if the target node is lower than the current node according to a predicate order, update the current node.

11. A publication-subscription broker server computing system for filtering one or more messages to be transmitted to a subscriber computing system according to an individual information request criteria, the broker server computing system comprises:

a memory module;

a mass storage system; and a programmable processing module, the programmable processing module performing a sequence of operations to implement the following:

constructing a binary decision diagram implication graph for each individual information request criteria specified for each subscriber, the binary decision diagram implication graph including a plurality of nodes expressing each information request criteria in an if-then-else normal form, the nodes being evaluated until a logical true or false node is reached;

identifying logical implications from one or more nodes in a binary decision diagram from a first information request criteria to one or more corresponding binary decision diagrams within a second information request criteria;

receiving one or more messages to be filtered;

evaluating a first information request criteria based upon information within the received messages;

evaluating one or more information request criteria based upon information within the received messages using the identified logical implications between one or more binary decision diagrams within the information request criteria being evaluated and one or more binary decision diagrams previously evaluated; and transmitting the received message to the subscriber computing system corresponding to an information request criteria evaluated to be satisfied by information contained within the received message.

12. The broker server computing system according to claim 11, wherein the constructing the implication graph further comprises:

recursively visiting the high and low successors for each node in the binary decision diagrams;

while visiting each node, determine the precondition pre(X') for each successor and compute the target t(X') for all visited nodes and apply permissible implications; and iterate the processing for all implications.

13. The broker server computing system according to claim 11, wherein permissible implications for a node M with successor node N include:

if node N is equal to the high successor high(M), and if p(M) implies p(N), then remove N and set the high(M) equal to high(N); and if p(M) implies ! p(N), then remove N and set high(M) equal to low(N).

14. The broker server computing system according to claim 12, wherein permissible implications for a node M with successor node N include:

if node N is equal to the low successor low(M), and if ! p(M) implies p(N), then remove N and set the low(M) equal to high(N); and if ! p(M) implies ! p(N), then remove N and set low(M) equal to low(N).

15. The broker server computing system according to claim 12, wherein the evaluating steps further comprises:

determining if a current node is a leaf node in the binary decision diagram;

if the current node is a leaf node, marking the information request criteria as being decided and returning the value of the current node;

if the current node is not a leaf node, determining a value of the expression for the node p(X);

if the value of the expression of the node is true setting X'=high(X) otherwise X'=low(X);

inserting X' into the rank; and visiting the targets of node X' to compare the current node with the target node;

if the target node is lower than the current node according to a predicate order, update the current node.

\* \* \* \* \*